United States Patent
Sun et al.

(10) Patent No.: US 12,096,264 B2
(45) Date of Patent: Sep. 17, 2024

(54) METHOD AND APPARATUS FOR HANDLING SIDELINK REPORTS

(71) Applicant: Telefonaktiebolaget LM Ericsson (PUBL), Stockholm (SE)

(72) Inventors: Wanlu Sun, Solna (SE); Congchi Zhang, Aachen (DE); Zhang Zhang, Beijing (CN); Shehzad Ali Ashraf, Aachen (DE); Ricardo Blasco Serrano, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 354 days.

(21) Appl. No.: 17/594,786

(22) PCT Filed: Mar. 31, 2020

(86) PCT No.: PCT/CN2020/082416
§ 371 (c)(1),
(2) Date: Oct. 29, 2021

(87) PCT Pub. No.: WO2020/220910
PCT Pub. Date: Nov. 5, 2020

(65) Prior Publication Data
US 2022/0225143 A1    Jul. 14, 2022

(30) Foreign Application Priority Data

Apr. 30, 2019 (WO) ................ PCT/CN2019/085381

(51) Int. Cl.
*H04W 24/10* (2009.01)
*H04W 72/23* (2023.01)
*H04W 92/18* (2009.01)

(52) U.S. Cl.
CPC .......... *H04W 24/10* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2014/0177542 A1* | 6/2014 | Novak | H04W 72/23 370/329 |
| 2017/0118671 A1 | 4/2017 | Lee et al. | |
| 2018/0295646 A1* | 10/2018 | Faurie | H04W 72/23 |

(Continued)

FOREIGN PATENT DOCUMENTS

| CN | 109644460 A | 4/2019 |
|---|---|---|
| WO | 2018 094872 A1 | 5/2018 |

OTHER PUBLICATIONS

3GPP TSG-RAN WG1 Meeting #95; Spokane, Washington, USA; Source: Fujitsu; Title: Efficient Sidelink CSI Feedback Mechanism for Groupcast NR-V2X (R1-1812408)—Nov. 12-16, 2018.

(Continued)

*Primary Examiner* — Sai Aung
(74) *Attorney, Agent, or Firm* — Baker Botts L.L.P.

(57) ABSTRACT

Various embodiments of the present disclosure provide methods and apparatuses for handling report of channel state information for sidelink. A method performed by a base station comprises receiving, from a first terminal device, at least one report indicating channel state information of at least one sidelink connection associated with the first terminal device.

17 Claims, 12 Drawing Sheets

(56) References Cited

U.S. PATENT DOCUMENTS

| | | | |
|---|---|---|---|
| 2018/0324848 A1* | 11/2018 | Baghel | H04W 88/04 |
| 2020/0008030 A1* | 1/2020 | Kim | H04W 72/23 |
| 2020/0196327 A1* | 6/2020 | Zhang | H04W 72/21 |
| 2021/0212023 A1* | 7/2021 | Zeng | H04W 4/48 |
| 2021/0266868 A1* | 8/2021 | Shin | H04W 72/23 |
| 2022/0078818 A1* | 3/2022 | Sun | H04L 67/535 |

OTHER PUBLICATIONS

3GPP TSG RAN WG1 #97; Reno, USA; Source: Spreadtrum Communications; Title: Discussion on NR sidelink mode 1 resource allocation (R1-1906363)—May 13-17, 2019.

PCT Notification of Transmittal of the International Search Report and the Written Opinion of the International Searching Authority, or the Declaration issued for International application No. PCT/CN2020/082416—Jun. 30, 2020.

Extended European Search Report issued for Application No. / Patent No. 20798663.9-1215 / 3963993 PCT/CN2020082416—Dec. 9, 2022.

3GPP TSG RAN WG1 Meeting #96bis, Xi'an, China, Source: Intel Corporation; Title: Network controlled sidelink resource allocation design for NR V2X communication (R1-1904295)—Apr. 8-12, 2019.

3GPP TSG RAN WG1 #96bis; Xi'an, China; Source: Samsung; Title: on Physical Layer Procedures for NR V2X (R1-1904426)—Apr. 8-12, 2019.

Office Action issued for Japanese Patent Application No. 2021/545925—Nov. 4, 2022.

3GPP TSG RAN WG1 #95, Spokane, US; Source: Samsung; Title: Discussion on Uu-based sidelink resource allocation and configuration (R1-1812989)—Nov. 12-16, 2018.

3GPP TSG RAN WG1 RAN1 #96bis; Xi'an, China; Source: Intel Corporation; Title: Design of physical layer procedures for NR V2X sidelink communication (R1-1904299)—Apr. 8-12, 2019.

3GPP TSG RAN WG1 #96bis; Xi'an, China; Source: NTT DOCOMO, INC.; Title: NR Sidelink Resource Allocation Mechanism Mode 1 (R1-1905422)—Apr. 8-12, 2019.

Official Action issued for Chinese Application No. 202080023450.6—Feb. 5, 2024.

* cited by examiner

9000

9010

Transmit, to a first terminal device, a request for at least one report indicating channel state information of at least one sidelink connection associated with the first terminal device;

9020

Receive the at least one report from a first terminal device.

Receive, from a base station, a request for at least one report indicating channel state information of at least one sidelink connection related to the first terminal device;

10020

Obtain the at least one report;

10030

Transmit the at least one report to the base station.

Fig. 10

METHOD AND APPARATUS FOR HANDLING SIDELINK REPORTS

PRIORITY

This nonprovisional application is a U.S. National Stage Filing under 35 U.S.C. § 371 of International Patent Application Serial No. PCT/CN2020/082416 filed Mar. 31, 2020 and entitled "Method and Apparatus for Handling Sidelink Reports", which claims priority to International Patent Application Serial No. PCT/CN2019/085381 filed Apr. 30, 2019 both of which are hereby incorporated by reference in their entirety.

FIELD OF THE INVENTION

The present disclosure generally relates to wireless communications, and more specifically, to methods and apparatuses for handling sidelink reports.

BACKGROUND

This section introduces aspects that may facilitate a better understanding of the disclosure. Accordingly, the statements of this section are to be read in this light and are not to be understood as admissions about what is in the prior art or what is not in the prior art.

The LTE standard has been extended with a support of device-to-device (D2D) (specified as "sidelink") features targeting vehicular communications, which are also referred to as V2V (Vehicle-to-vehicle) or V2X (Vehicle-to-anything communication). LTE Rel-14 targeted mainly safety services (e.g., cooperative awareness messages, CAM, and decentralized environmental notification messages, DENM). LTE Rel-15 provided some basic functionality for advanced uses cases, such as platooning, sensor sharing, and cooperative driving, etc.

3GPP has started a new study item (SI) within the scope of Rel-16 to develop a new radio (NR) version of V2X communications. The NR V2X will mainly target advanced V2X services, which can be categorized into four use case groups: vehicles platooning, extended sensors, advanced driving and remote driving. The advanced V2X services would require an enhanced NR system and a new NR sidelink to meet stringent requirements in terms of latency and reliability. A NR V2X system also expects to have higher system capacity and better coverage and to allow for easy extension to support the future development of further advanced V2X services and other services.

Due to the nature of the basic road safety services, the existing technical solutions for LTE V2X are designed mainly for broadcast transmissions. That means that the intended receiver of each message is all the UEs (User Equipment) within a relevant distance to the transmitter. In broadcast communications of a physical layer, the transmitter, in fact, may not have the notion of intended receivers.

Given the targeted services of NR V2X, it is commonly recognized that groupcast/multicast and unicast transmissions are desired, in which an intended receiver of a message consists of only a subset of the vehicles in proximity to the transmitter (groupcast) or of a single vehicle (unicast). For example, in the platooning service there are certain messages that are only of interest of the member of the platoon, making the members of the platoon a natural groupcast. In another example, the see-through use case most likely involves only a pair of vehicles, for which unicast transmissions naturally fit. Moreover, for groupcast, usually there is a common group destination address/identity to indicate the target receivers.

For unicast/groupcast, CSI (channel state information) reports from target receiver(s) can be beneficial for many aspects, e.g., more appropriate transmission parameters including MCS and transmit power, multi-antenna transmission schemes, and resource allocation. However, the previous studies of sidelink focus on broadcast, and thus there is no concept of sidelink CSI report. Correspondingly, there is no sidelink CSI report sent to a network side (e.g. an eNB) either.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The present disclosure proposes solutions for handling sidelink CSI report.

According to a first aspect of the present disclosure, there is provided a method performed by a base station. The method comprises receiving, from a first terminal device, at least one report indicating channel state information of at least one sidelink connection associated with the first terminal device.

In accordance with an exemplary embodiment, the method may further comprise, transmitting control information indicative of resources to be used for a transmission of the at least one report from the first terminal device to the base station. The resources are allocated for the transmission of the at least one report from the first terminal device to the base station, in response to a scheduling request from the first terminal device.

In accordance with an exemplary embodiment, the method may further comprise, transmitting, to the first terminal device, an uplink grant and an indication indicating that the uplink grant is to be used for a transmission of the at least one report from the first terminal device to the base station.

In accordance with an exemplary embodiment, a report of the at least one report may indicate an identifier of the at least one sidelink connection.

In accordance with an exemplary embodiment, the method may further comprise, transmitting, to the first terminal device, a request for the at least one report. The at least one report may be received in response to the request. The request may comprise control information indicative of resources to be used for the transmission of the at least one report from the first terminal device to the base station. The request indicates an identifier of the at least one sidelink connection. The request may be transmitted via downlink control information, a media access control, MAC, control element, or a radio resource control, RRC, message.

In accordance with an exemplary embodiment, the method may further comprise, adapting sidelink scheduling information based on the at least one report. The method may further comprise transmitting the sidelink scheduling information to a transmitting party of the at least one sidelink connection. The sidelink scheduling information may indicate the identifier of the at least one sidelink connection. The sidelink scheduling information may be carried via downlink control information.

In accordance with an exemplary embodiment, the first terminal device is a transmitting party of the at least one sidelink connection.

In accordance with an exemplary embodiment, the request may comprise an indication indicating that the first terminal device is a transmitting party of the at least one sidelink connection.

In accordance with an exemplary embodiment, the first terminal device may be a receiving party of the at least one sidelink connection.

In accordance with an exemplary embodiment, the request comprises an indication indicating that the first terminal device is a receiving party of the at least one sidelink connection.

In accordance with an exemplary embodiment, at least one report may be received on a physical uplink shared channel, PUSCH, or a physical uplink control channel, PUCCH.

In accordance with an exemplary embodiment, the at least one sidelink connection may be for a unicast sidelink transmission or a groupcast sidelink transmission.

In accordance with an exemplary embodiment, the at least one report may comprise a direction indication of the at least one sidelink connection.

According to a second aspect of the present disclosure, there is provided a method performed by a terminal device. The method comprises obtaining at least one report indicating channel state information of at least one sidelink connection associated with the terminal device; and transmitting, to a base station, the at least one report.

In accordance with an exemplary embodiment, the method may further comprise, receiving, from the base station, sidelink scheduling information, the sidelink scheduling information indicating an identifier of the at least one sidelink connection; and deciding whether or not to use the sidelink scheduling information based on the identifier of the at least one sidelink connection. The sidelink scheduling information may be carried via downlink control information.

In accordance with an exemplary embodiment, the method may further comprise, receiving the at least one report from another terminal device associated with the at least one sidelink connection.

In accordance with an exemplary embodiment, the method may further comprise, transmitting a scheduling request to the base station for transmission of the at least one report from said another terminal device to the terminal device; and receiving a sidelink grant for the transmission of the at least one report from the base station. The at least one report may be received from said another terminal device over the at least one sidelink connection according to the received sidelink grant.

In accordance with an exemplary embodiment, the at least one report may be transmitted in one or more media access control, MAC, control elements, which are multiplexed with MAC data, wherein the one or more MAC control elements are located before or after the MAC data. At least one of the one or more MAC control elements for transmitting the at least one report may be multiplexed with the MAC data from a logical channel associated with the sidelink connection. In accordance with an exemplary embodiment, the method may further comprise, prioritizing the transmission for the at least one report and a sidelink data transmission.

In accordance with an exemplary embodiment, the method may further comprise, receiving control information indicative of resources to be used for a transmission of the at least one report from the terminal device to the base station.

In accordance with an exemplary embodiment, the method may further comprise, transmitting, to the base station, a scheduling request for the transmission of the at least one report from the terminal device to the base station. The control information indicative of resources to be used for the transmission of the at least one report from the terminal device to the base station is received in response to the scheduling request.

In accordance with an exemplary embodiment, the method may further comprise, receiving, from the base station, an uplink grant and an indication indicating that the uplink grant is to be used for a transmission of the at least one report from the terminal device to the base station.

In accordance with an exemplary embodiment, the at least one report is a subset of a plurality of reports for a respective plurality of sidelink connections associated with the first terminal device.

In accordance with an exemplary embodiment, the at least one report indication indicates an identifier of the at least one sidelink connection.

In accordance with an exemplary embodiment, the method may further comprise, receiving, from the base station, a request for the at least one report. The at least one report may be transmitted in response to the request. The request may comprise control information indicative of resources to be used for the transmission of the at least one report from the terminal device.

In accordance with an exemplary embodiment, the terminal device may be a transmitting party of the at least one sidelink connection.

In accordance with an exemplary embodiment, the request may comprise an indication indicating that the terminal device is the transmitting party.

In accordance with an exemplary embodiment, the terminal device is a receiving party of the at least one sidelink connection.

In accordance with an exemplary embodiment, the request may comprise an indication indicating that the terminal device is the receiving party.

According to a third aspect of the present disclosure, there is provided a base station. The base station may comprise one or more processors and one or more memories comprising computer program codes. The one or more memories and the computer program codes may be configured to, with the one or more processors, cause the network node at least to perform any step of the method according to the first aspect of the present disclosure.

According to a fourth aspect of the present disclosure, there is provided a computer-readable medium having computer program codes embodied thereon which, when executed on a computer, cause the computer to perform any step of the method according to the first aspect of the present disclosure.

According to a fifth aspect of the present disclosure, there is provided a terminal device. The terminal device may comprise one or more processors and one or more memories comprising computer program codes. The one or more memories and the computer program codes may be configured to, with the one or more processors, cause the terminal device at least to perform any step of the method according to the second aspect of the present disclosure.

According to a sixth aspect of the present disclosure, there is provided a computer-readable medium having computer program codes embodied thereon which, when executed on a computer, cause the computer to perform any step of the method according to the second aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which:

FIG. 9 is a flowchart illustrating a method performed by a base station according to some embodiments of the present disclosure;

FIG. 10 is a flowchart illustrating a method performed by a terminal device according to some embodiments of the present disclosure;

DETAILED DESCRIPTION

Figure 1:
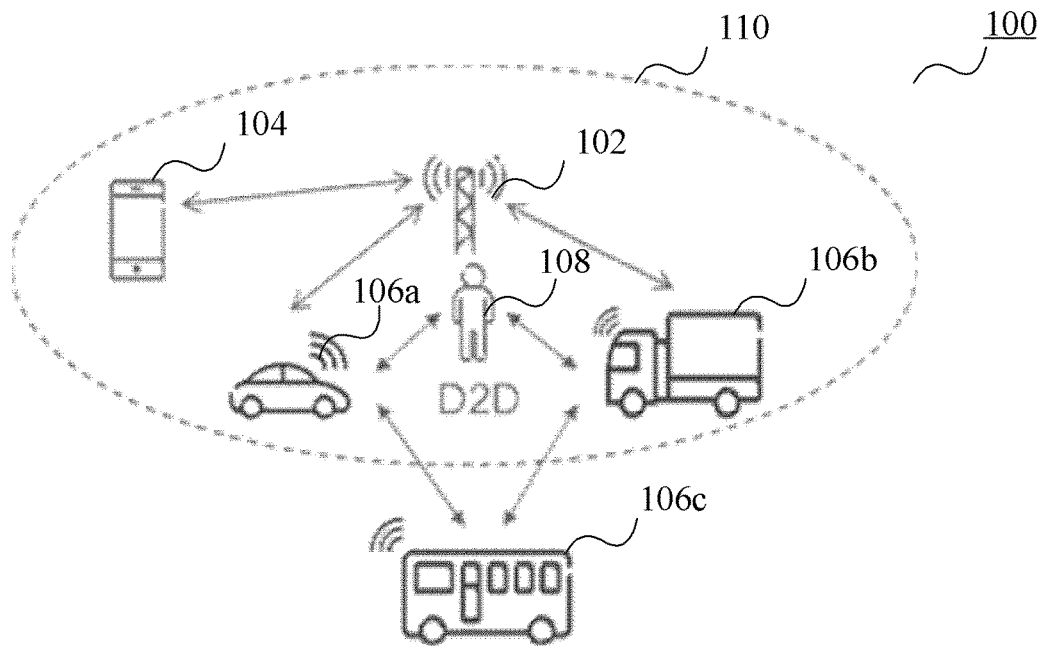
FIG. 1 is a diagram illustrating a V2X scenarios for an LTE-based network.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "base station" refers to a network device or a network node in a communication network via which a terminal device accesses to the network and receives services therefrom. The base station may refer to a BS, an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), an IAB node, a remote radio unit (RRU), a radio header (RH), a remote radio head (RRH), a relay, a low power node such as a femto, a pico, and so forth.

Yet further examples of the base station comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

FIG. 1 is a diagram illustrating a communication system of Vehicle-to-anything (V2X) communications in a communication network, in which some embodiments of the present disclosure can be implemented.

With reference to FIG. 1, in accordance with an embodiment, a communication system 100 includes a telecommunication network 110, such as a 3GPP-type cellular network, which comprises an access network, such as a radio access network, and a core network. The access network comprises a plurality of base stations (collectedly denoted as 102), such as NBs, eNBs, gNBs or other types of wireless access points, each defining a corresponding coverage area. Each base station 102 is connectable to the core network over a wired or wireless connection. A UE 104 located in a coverage area of one base station 102 is configured to wirelessly connect to, or be paged by, the corresponding base station. Vehicles 106a and 106b in the coverage area of the base station 102 is wirelessly connectable to the base station 102. While a sole UE 104 is illustrated in this example, the disclosed embodiments are equally applicable to a situation where a plurality of UEs are in the coverage area, or where a plurality of UEs are connecting to the corresponding base station 102. While a plurality of vehicles 106a, 106b are illustrated in this example, the disclosed embodiments are equally applicable to a situation where a sole vehicle is in the coverage area or where a sole vehicle is connecting to the corresponding base station 102.

The communication system 100 of FIG. 1 as a whole enables V2X connectivity between the connected vehicles (such as 106a, 106b) and the connected UEs (such as 104). The communication system 100 also enables V2X connectivity between the connected vehicles and any other things that are not connecting to telecommunication network 110.

Two modes are defined for NR sidelink. For mode-1, a base station (e.g., gNB) schedules resources and potentially also some transmission parameters to be used by a sidelink transmission. For mode-2, a UE determines sidelink transmission resources within the sidelink resources configured by base station/network or pre-configured.

A sidelink transmission is associated with a source L1/L2 ID (identifier) and a destination L1/L2 ID. For sidelink unicast, upon implementation, a source L1/L2 ID may reflect a service type and/or a transmitting UE ID, which will become a destination L1/L2 ID of a peer UE. For sidelink groupcast, a source L1/L2 ID represents the transmitting UE ID, and a destination L1/L2 ID represents a group identifier, which may be provided by an upper layer, or a service type. For sidelink broadcast, a source L1/L2 ID represents a transmitting UE ID, and a destination L1/L2 ID represents a service type.

It should be noted that, different applications with different QoS requirements may be associated with a same service type. For instance, platooning service may include video sharing application and control messaging application.

Figure 2:
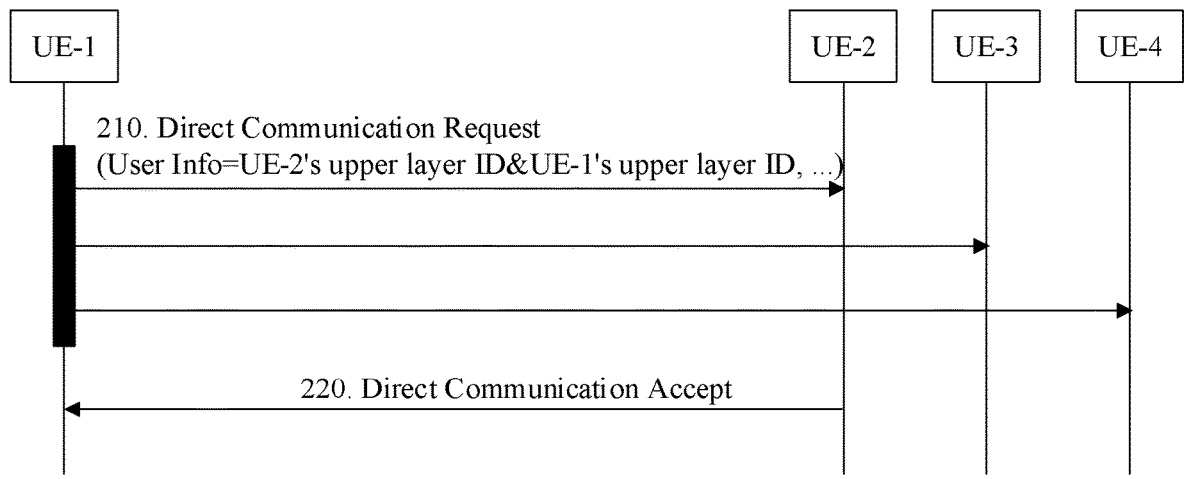
FIG. 2 is a diagram illustrating an exemplary procedure for establishing a sidelink unicast link.

FIG. 2 is a diagram illustrating an exemplary procedure for establishing a sidelink unicast link. As shown at 210, an initiating UE, e.g. UE-1, broadcasts a PC5-S message conveying relevant application IDs, which is associated with a specific service. The PC5-S message also carries a L1/L2 ID of the initiating UE, e.g. UE-1. Then, a UE who receives the initiating PC5-S message and has the same interest (or it is a target peer UE), can response in a unicast manner using the L1/L2 ID of the initiating UE, as shown at 220. As such, a secured unicast link can be established after a security setup procedure (not shown).

Upon implementation, multiple links can be established between a same UE pair. These multiple links are using different pairs of L1/L2 IDs from UEs.

As described above, although it is considered that CSI reports can be beneficial for sidelink unicast/groupcast, there is no solution for supporting CSI reports in sidelink unicast/groupcast. The existing LTE sidelink studies focus on broadcast and thus there is no concept of sidelink CSI report. Correspondingly, there is no sidelink CSI report sent to eNB either. For sidelink in a network-controlled mode, the parameters contained in DCI (downlink control information) 5A are not tailored for any specific sidelink receiver, and therefore are not efficient for sidelink unicast/groupcast.

For NR sidelink, to improve sidelink unicast and/or groupcast, a sidelink CSI report is considered beneficial. However, it is not clear how to realize it. First, it is unclear how a receiving UE in sidelink transmits a CSI report to a transmitting UE over sidelink, e.g. whether it is transmitted as a sidelink MAC (media access control) CE (control element) or as a PC5-RRC (radio resource control) message. It should be note that, a sidelink MAC CE has not been defined yet.

In case of mode-1 operation, gNB has to know a CSI report so to adapt transmission parameters. If the concept of CSI report in NR Uu is reused for the sidelink CSI report, the sidelink receiving UE will measure sidelink CSI parameters, and then send them to its associated gNB. However, this doesn't work well if a pair of sidelink UEs (i.e. a sidelink transmitting UE and a sidelink receiving UE) is not in coverage of a same gNB, since eventually it is the gNB associated with the transmitting UE which will make use of the CSI report to schedule sidelink. Besides, considering the fact that one UE may maintain multiple connections with different UEs, it is also an issue that for operations in mode-1 how a gNB distinguishes different UE pairs with respect to acquisition and scheduling for CSI reports for the multiple connections.

This disclosure proposes a set of mechanisms to handle and make use of sidelink CSI report. It proposes different solutions to trigger and send sidelink CSI report to a base station, such as a gNB. It further proposes different solutions for a base station to assign transmission parameters to a correct sidelink connection, which can be realized by introducing a new DCI format which contains a corresponding sidelink connection ID. Furthermore, a new way of carrying CSI report over sidelink is introduced in this disclosure.

Details of solutions proposed in this disclosure would be described in the context of sidelink V2X communications below. However, most of the embodiments are applicable to direct communications between UEs, which may involve device-to-device communications in other scenarios. In the following description, sidelink in mode-1 is used to denote a general concept of network-controlled sidelink transmissions, where the network (e.g., gNB) determines and/schedules resources and/or (some) transmissions parameters for sidelink.

This disclosure proposes a set of methods to enable efficient sidelink transmissions, especially when sidelink CSI report is used to improve the efficiency. In the following description, it is proposed that a gNB/UE can distinguish different sidelink connections via an identifier of the sidelink connection, which is referred to as connection ID. A sidelink connection ID represents one UE pair. For example, a sidelink connection ID may be a combination of a source L1/L2 ID and destination L1/L2 ID of a sidelink transmission between UEs of the UE pair. In some embodiments, there are multiple connections between a same UE pair. In this case, one UE pair can be represented by different sidelink connection IDs. One sidelink connection ID can be associated with one or multiple PC5-S links, which are established as shown in FIG. 2. The sidelink connection ID can be determined and managed with any suitable manner.

Figure 3:
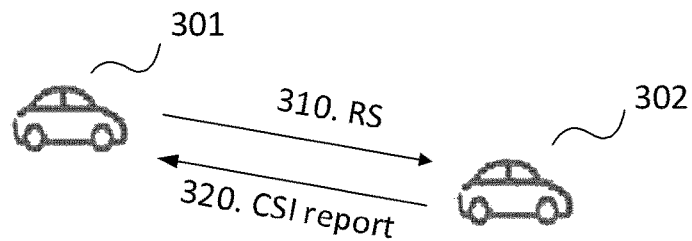
FIG. 3 is a diagram illustrating a procedure for obtaining a sidelink CSI report.

FIG. 3 is a diagram illustrating a procedure for obtaining a CSI report. In order to assist a sidelink unicast transmission from UE1 (such as a vehicle 301) to UE2 (such as a vehicle 302), UE1 can transmit a relevant reference signal (RS) to the UE2, as shown at 310. Then, the UE2 can report CSI calculated based on the RS, as shown at 320.

When a sidelink transmission operates in mode-1, a gNB would serve the sidelink by scheduling resources for the sidelink. For example, the gNB may determine at least one transmission parameters for the sidelink transmission. Hence, to enable more efficient mode-1 transmission, it is beneficial to make a CSI report available at the gNB as well. However, it is unclear how to trigger proper a sidelink CSI report and how to forward the report to gNB, especially when a UE is involved in multiple sidelink connections as described above. In the following, some possible solutions for this regard will be described.

Figure 4:
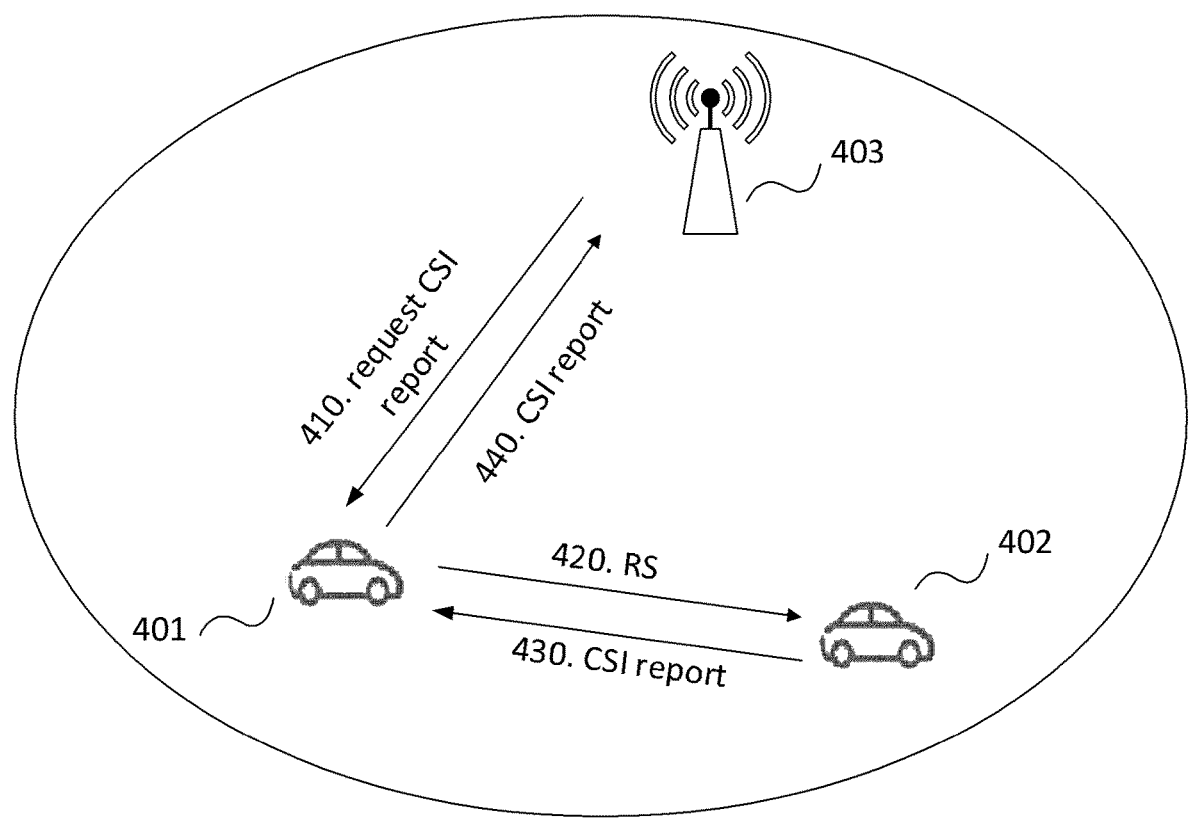
FIG. 4 is a diagram illustrating a scenario for handling a sidelink CSI report according to some embodiments of the present disclosure.

FIG. 4 is a diagram illustrating a scenario for handling a CSI report according to some embodiments of the present disclosure. In the scenario of FIG. 4, the procedure is triggered by a gNB. In this regard, a gNB may request a transmitting UE of a sidelink connection to send sidelink CSI report. As shown at 410, a gNB 403 may transmit, to a transmitting UE (denoted as 401) related with a sidelink connection, a request for the sidelink CSI report. In response to the request, the transmitting UE 401 can request a CSI report from the receiving UE (denoted as 402) over sidelink, as shown at 420. Then, the transmitting UE 401 can receive a sidelink CSI report from the receiving UE 402 as shown at 430, and forward the sidelink CSI report to the gNB 403 as shown at 440.

In some embodiments, the gNB 403 may allocate resources to be used for transmissions of the sidelink CSI report from the UE 401 to the gNB 403. The resources used for a transmission of the sidelink CSI report to the gNB 403 can be either on a PUSCH (physical uplink share channel) channel or on a PUCCH (physical uplink control channel) channel. Control information indicative of the allocated resource may be transmitted to the UE 401 together with the request in a same request message, or separately from the request. The control information may indicate assigned resources and transmission parameters for an uplink transmission. For example, the transmission parameters may include, but not limited to, MCS (modulation and coding scheme), transmit power, applied precoder, etc.

In some embodiments, the request from gNB 403 can be transmitted via DCI (downlink control information), MAC (media access control) CE (control element), or RRC (radio resource control) messages.

In some embodiments, the request from gNB 403 may include sidelink connection ID(s), i.e., indicating for which sidelink connection(s) the gNB 403 is requesting a CSI report.

In other embodiments, the request from gNB 403 does not include sidelink connection ID(s). In this case, the gNB 403 may issue a grant, and indicate (e.g. by one bit) that the grant is to be used to schedule resources for transmitting a sidelink CSI report to the gNB 403 in an uplink. Optionally, this uplink grant can be used to schedule resources for other purpose, when no sidelink CSI report is available. Then, the transmitting UE 401 may obtain CSI reports for all sidelink connections, and transmit the obtained CSI reports to the gNB 403. As mentioned above, there may be multiple sidelink connections between the transmitting UE 401 and the receiving UE 402. Furthermore, there may be one or more sidelink connections established between the transmitting UE 401 and another terminal device (not shown). In the above example, CSI reports of all these sidelink connections associated with the transmitting UE 401 can be obtained and transmitted to the gNB 403. Alternatively, the transmitting UE 401 may select a number of CSI reports from the CSI reports of all these sidelink connections, for transmitting the CSI reports to the gNB 403. In an example, the selection can be made according to a size of the uplink grant. In another example, the UE 401 may prioritize transmission of CSI report(s) for which the corresponding sidelink connection(s) carry high priority traffic.

In some embodiments, the CSI report(s) can be transmitted to the gNB 403 together with the associated sidelink connection ID(s).

After receiving the sidelink CSI report, the gNB 403 may perform mode-1 scheduling for a sidelink transmission between the UE 401 and the UE 402, based on the received sidelink CSI report. In this regard, a DCI for scheduling a sidelink transmission can be transmitted to the UE 401. The DCI may indicate assigned resources and transmission parameters for the sidelink transmission. For example, the transmission parameters may include, but not limited to, MCS (modulation and coding scheme), transmit power, applied precoder, etc. In one example, the transmission parameters for sidelink transmission are derived based on the CSI report received by the gNB 403. This can improve the efficiency of sidelink mode-1 transmissions, since the gNB 403 can determine proper transmission parameters based on the sidelink CSI report. In some embodiments, the DCI may further include a sidelink connection ID, indicating to which sidelink connection the scheduling information of the DCI is relevant. In this way, the gNB 503 can assign the transmission parameters to a correct sidelink connection.

Figure 5:
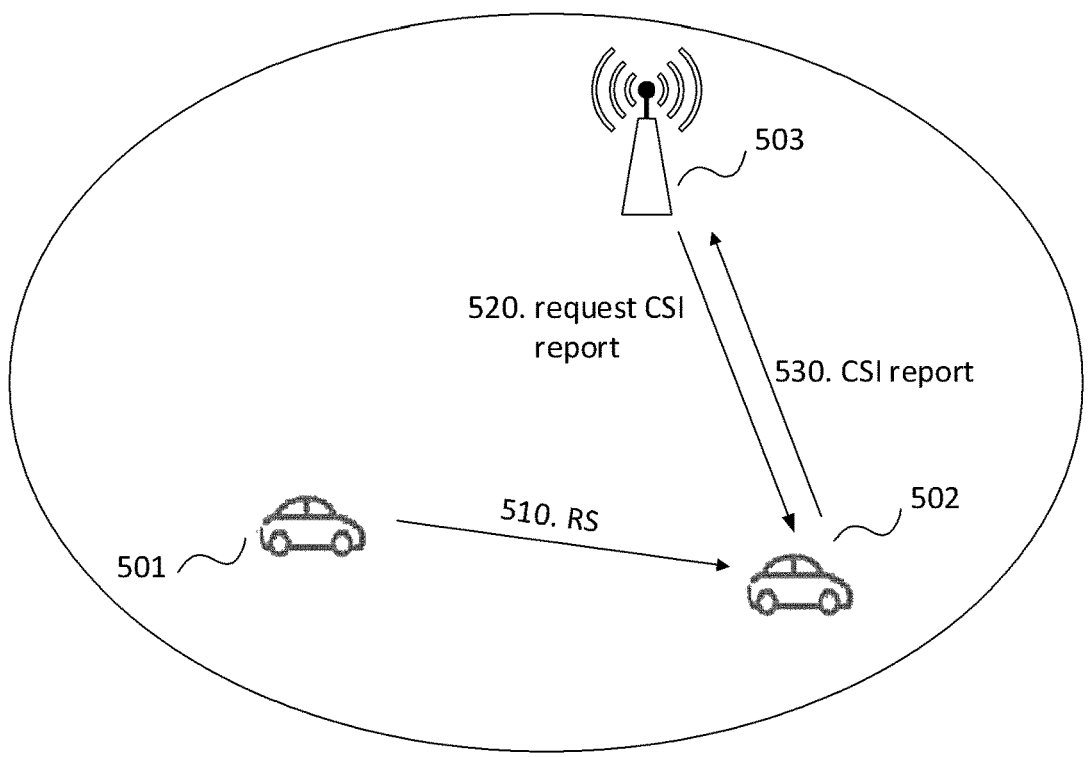
FIG. 5 is a diagram illustrating another scenario for handling a sidelink CSI report according to some embodiments of the present disclosure.

FIG. 5 is a diagram illustrating another scenario for handling a CSI report according to another embodiment of the present disclosure. In this embodiment, a gNB may request a receiving UE to send a sidelink CSI report, and allocate resources to be used for transmissions of the sidelink CSI report from the receiving UE to the gNB. As shown in FIG. 5, a gNB 503 sends a request for a sidelink CSI report to a receiving UE 502, at 520. In response to the request, the receiving UE 502 transmits a sidelink CSI report to the gNB 503, at 530. The sidelink CSI report may be obtained by the UE 502 prior to the receipt of the request. For example, UE 502 may generate a CSI report for a sidelink transmission from UE 501 to the UE 502 based on reference signals (510) from the UE 501, periodically. In other example, the CSI report may be generated in response to the request.

In some embodiments, the request from gNB 503 can be transmitted via DCI, MAC CE, or RRC messages. In some embodiments, the gNB 503 may allocate resources to be used for transmissions of the sidelink CSI from the UE 401 to the gNB 503. The resources used for sidelink CSI report transmissions to the gNB 503 can be either on a PUSCH channel or on a PUCCH channel. Control information indicative of the allocated resource may be transmitted to the UE 502 together with the request in a same request message, or separately from the request.

In some embodiments, the request from the gNB 503 may include sidelink connection ID(s), i.e., indicating for which sidelink connection(s) the gNB 503 is requesting a CSI report.

In another example, the request from the gNB 503 does not include sidelink connection ID(s). In this case, the gNB 503 may issue a grant, and indicate (e.g. by one bit) that the grant is to be used to schedule resources for transmitting a sidelink CSI report to the gNB 503 in an uplink. Optionally, this uplink grant can be used to schedule resources for other purpose, when no sidelink CSI report is available. Then, the UE 502 receiving the request may obtain CSI reports for all sidelink connections, and transmit the obtained CSI reports to the gNB 503. Alternatively, the UE 502 may select a number of CSI reports from the CSI reports of all these sidelink connections, and transmit the CSI reports to the gNB 503 at 530. In an example, the selection can be made according to the size of the uplink grant. In another example, the UE 502 may prioritize the transmission of CSI report(s) for which the corresponding sidelink connection(s) carry high priority traffic.

In some embodiments, the sidelink CSI report(s) can be transmitted to the gNB 503 together with the associated sidelink connection ID(s).

After receiving the sidelink CSI report, the gNB 503 may perform mode-1 scheduling for a sidelink transmission between the UE 501 and the UE 502, based on the received sidelink CSI report. In this regard, a DCI for scheduling the sidelink transmission can be transmitted to a transmitting UE, i.e. the UE 501 in this case. Similar as the embodiments illustrated in FIG. 4, the DCI may include a sidelink connection ID, indicating to which sidelink connection the scheduling information of the DCI is relevant. In this way, the gNB 403 can assign the transmission parameters to a correct sidelink connection.

The embodiments illustrated in FIGS. 4 and 5 can be adopted jointly. For example, a gNB may transmit a request for sidelink CSI report to both a transmitting UE and a receiving UE, where the transmitting UE and the receiving UE may be a same UE. In an embodiment, a CSI report transmitted from a UE to a gNB may comprise a direction indication of a sidelink connection for which the CSI report is generated. The direction indication can indicate whether the UE acts as a transmitting UE or a receiving UE of the sidelink connection.

In one embodiment, a gNB may request at least one sidelink CSI report for one specific sidelink connection. In another embodiment, a gNB may request at least one sidelink CSI report for multiple sidelink connections, e.g. where one specific UE is involved. In this case, the one specific UE may act as a transmitting UE in multiple sidelink connections with a same receiving UE or different receiving UEs. Additionally or alternatively, the one specific UE may act as a receiving UE in multiple sidelink connections with a same receiving UE or different transmitting UEs. In some embodiment, when requesting a sidelink CSI report of a sidelink connection from a UE, the gNB may indicate that the UE acts as a transmitting UE or a receiving UE in a sidelink connection. Then, the UE may forward a sidelink CSI report accordingly.

In one embodiment, when requesting a sidelink CSI report, the gNB may also indicates the sidelink connection ID(s) for which it is requesting. As described with reference to FIGS. 4 and 5 above, the request may comprise sidelink connection ID(s).

In some embodiments, the sidelink connection ID(s) may be included in the request from gNB, but not in the CSI report(s) transmitted to the gNB. In this case, the gNB may indicate which uplink resource the UE should use to send the sidelink CSI report for a specifically sidelink connection. Then, the gNB may distinguish sidelink CSI reports according to the corresponding relation between an uplink resource and a sidelink connection.

In some embodiments, a gNB may initiate a scheduling of an uplink resource to be used for a transmission of a sidelink CSI to the gNB, e.g. when the gNB determine to request a sidelink CSI report. In other embodiments, a gNB may schedule the uplink resource to be used for a transmission of a sidelink CSI report based on a scheduling request by a UE. In this regard, either a transmitting UE or a receiving UE may trigger a scheduling request, if it intends to transmit a sidelink CSI report to a gNB. For example, such scheduling request may be triggered when there is a CSI report available at the UE. In one embodiment, a prohibit timer can be defined to prohibit excessive CSI report transmissions from the UE.

Figure 6:
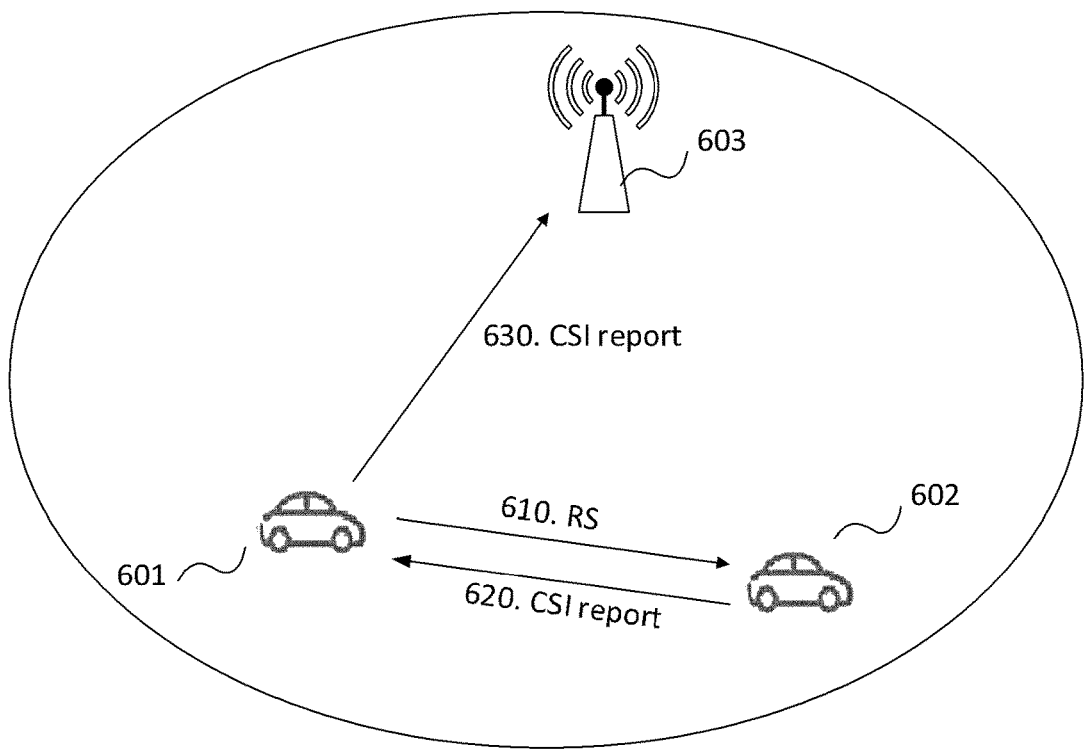
FIG. 6 is a diagram illustrating another scenario for handling a sidelink CSI report according to some embodiments of the present disclosure.
Figure 7:
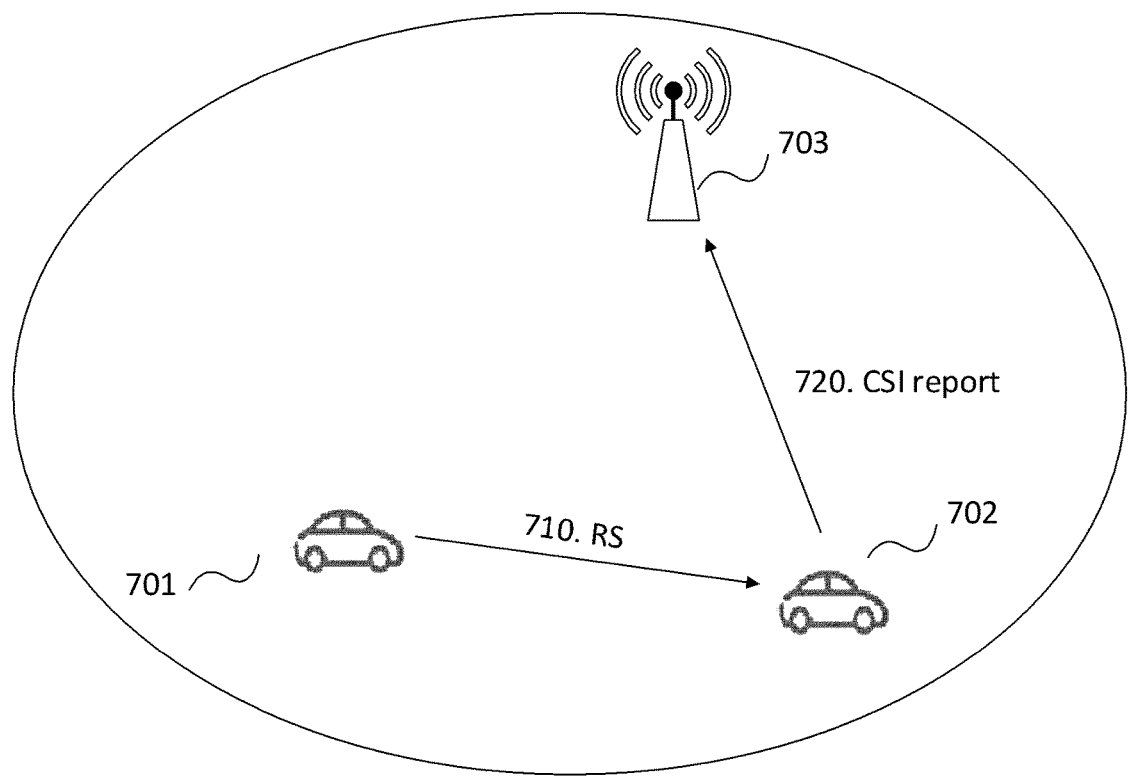
FIG. 7 is a diagram illustrating another scenario for handling a sidelink CSI report according to some embodiments of the present disclosure.

In embodiments illustrated in FIGS. 4 and 5, a procedure for handling a sidelink CSI report is triggered by a gNB. In these embodiments, the sidelink CSI report is transmitted to a gNB in response to a request from the gNB. This disclosure further proposes solutions, in which the procedure of handling a sidelink CSI report is triggered by a UE. FIGS. 6 and 7 illustrate two scenarios of this procedure.

As shown in FIG. 6, a UE 601 obtains at least one CSI report for a sidelink connection between the UE 601 and a UE 602. For example, the CSI report can be obtained in a normal manner. The UE 601 transmits reference signals to another UE 602 over a sidelink connection, as shown at 610. Accordingly, the UE 601 receives a CSI report from the UE 602, as shown at 620. The UE 601 may obtain the CSI report periodically.

At 620, the UE 601 can initiate a transmission of the CSI report to a gNB 603. In an embodiment, a transmission of the CSI report may be triggered when there is a CSI report available at the UE 601. In another embodiment, a transmission of the CSI report may be triggered when the CSI report obtained by the UE 601 fulfill a predefined condition. For example, a prohibit timer can be defined to prohibit excessive CSI report transmissions from the UE to the gNB.

The CSI report may be transmitted on a PUSCH channel or a PUCCH channel. In some embodiments, the UE 601 may utilize an uplink resource allocated to it previously for the transmission of the sidelink CSI report. In other embodiments, the UE 601 may trigger a scheduling request to the gNB 603 when it intends to transmit the sidelink CSI report. The gNB 603 may schedule an uplink resource for the transmission of the sidelink CSI report based on the scheduling request. In this regard, DCI may be transmitted to the UE 601 to indicate the scheduled uplink resource.

FIG. 7 differs from FIG. 6 only in that a receiving UE of a sidelink transmission may trigger the procedure for handling a sidelink CSI report. The UE 702 may obtain sidelink CSI report based on reference signals from a transmitting UE (denoted as 701) as shown at 710, and initiate a transmission of the sidelink CSI report to a gNB 703 as shown at 720.

As described above, in some embodiments, a gNB can transmit a request for a sidelink CSI report of a sidelink connection via DCI, and for mode-1 sidelink, a gNB can transmit scheduling information for a sidelink connection via DCI. A sidelink connection ID can be indicated in the DCI. However, in existing DCI formats, there is no ID concept included in the DCI specified for sidelink.

The contents of DCI format 5A in LTE are the following:
carrier indicator;
lowest index of the subchannel allocation to the initial transmission;
frequency resource location of initial transmission and retransmission;
time gap between initial transmission and retransmission;
sidelink index (for time division duplexing, TDD, configuration 0-6);
sidelink SPS (semi-persistent scheduling) configuration (for SPS only);
activation/release indication (for SPS only).

For NR Uu interface, two basic DCI formats are defined: 0-0, known as the fallback format; and 0-1, known as the non-fallback format. The DCI format 0-0 can configure a smaller set of parameters. The contents for each of the formats are summarized in Table

TABLE 1

NR DCI contents for formats 0-0 and 0-1.

| | Field | Format 0-0 | Format 0-1 |
|---|---|---|---|
| Identifier | | 1 bit | 1 bit |
| Resource information | CFI | — | 0 or 3 bits |
| | UL/SUL | 0 or 1 bit | 0 or 1 bit |
| | BWP indicator | — | 0-2 bits |
| | Freq.-domain allocation | Variable (only type 1) | variable |
| | Time-domain allocation | 0-4 bits | 0-4 bits |

TABLE 1-continued

NR DCI contents for formats 0-0 and 0-1.

| | Field | Format 0-0 | Format 0-1 |
|---|---|---|---|
| | Ferquency hopping | 0 or 1 bit | 0 or 1 bit |
| TB-related | MCS | 5 bits | 5 bits |
| | NDI | 1 bit | 1 bit |
| | RV | 2 bis | 2 bis |
| HARQ-related | Process number | 4 bits | 4 bits |
| | DAI | — | 1-4 bits |
| | CBGTI | — | 0, 2, 4, or 6 bits |
| Multi-antenna related | DMRS seq initialization | — | 1 bit |
| | Antenna ports | — | 2-5 bits |
| | SRI | — | Variable |
| | Precoding information | — | 0-6 bits |
| | PTRS-DMRS assoc. | — | 0 or 2 bits |
| | SRS request | — | 2 bits |
| | CSI request | — | 0-6 bits |
| Power control | PUSCH power control | 2 bits | 2 bits |
| | Beta offset | — | 0 or 2 bits |

As shown above, there is no ID concept included in DCI 5A used in LTE sidelink, since the LTE sidelink targets only a broadcast service. Meanwhile, there is no ID concept included in DCI for NR Uu interface, since a gNB is aware of what the receiver is for an uplink transmission (i.e., the gNB itself). However, there is a need to introduce ID to DCI to distinguish different sidelink connections, since a UE may be involved in multiple unicast sidelink connections. Accordingly, this disclosure proposes a new DCI format carrying sidelink connection ID.

In one embodiment, a new DCI format containing a sidelink connection ID is defined for scheduling a sidelink, where the ID indicates for which sidelink connection the assigned resources and the transmission parameters contained in DCI are relevant. For example, the DCI format 5A can be extended to introduce an indication indicative of the sidelink connection ID. Here, the transmission parameters include, but not limited to, MCS, transmit power, applied precoder, etc. In one example, the transmission parameters in the new DCI for sidelink scheduling can be derived based on the CSI report received by the gNB, where the CSI report is associated with a same sidelink connection ID as the ID contained in the new DCI for sidelink scheduling.

In one embodiment, a sidelink transmitting UE may decide whether or not to use the transmission parameters contained in the new DCI for sidelink scheduling, based on the associated sidelink connection ID indicated in the new DCI. In one example, the transmitting UE may adopt the indicated transmission parameters only if the associated sidelink connection ID is the same as the connection ID of its intended sidelink transmission. In another example, the transmitting UE may still adopt the indicated transmission parameters even if the associated sidelink connection ID is different from the connection ID of its intended sidelink transmission.

In one embodiment, a new DCI format containing a sidelink connection ID is defined for transmitting a request for sidelink CSI report in uplink. For example, DCI for NR Uu interface can be extended to introduce an indication indicative of the sidelink connection ID.

Figure 8:
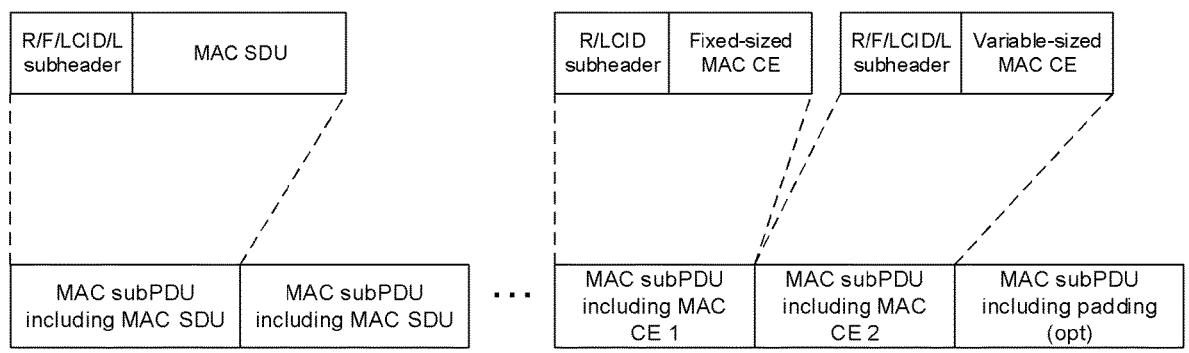
FIG. 8 is a diagram illustrating an example of a media access control (MAC) protocol data unit (PDU) in uplink.

As discussed above, it is unclear how a receiving UE transmits a CSI report to transmitting UE over sidelink. For example, it is unclear whether a sidelink CSI report is transmitted as a sidelink MAC CE or as a PC5-RRC message. Note that, sidelink MAC CE has not been defined yet. FIG. 8 illustrates an example of a MAC PDU in uplink. A MAC PDU consists of MAC SDUs and MAC CEs. MAC SDUs are data delivered from above layers, MAC CEs are information related to MAC layer control such as BSR, C-RNTI (Cell-Radio Network Temporary Identifier) etc.

The present disclosure proposes a new MAC CE carrying a sidelink CSI report over sidelink. In one embodiment, when a receiving UE transmits a CSI report to a transmitting UE over sidelink, it generates a sidelink MAC CE for carrying the CSI report, as shown at 430.

When there is a sidelink grant available, a sidelink MAC CE carrying a CSI report may be multiplexed into a MAC PDU and be transmitted using the current available SL grant. If it's a mode-1 grant, the associated transmission parameters which are scheduled by a gNB are applied. If it's a mode-2 grant, the transmitting UE may determine the transmission parameters by itself.

In another embodiment, even when there is a mode-1 sidelink grant available, a UE will not use it to transmit a newly generated CSI report. The UE triggers a new SR (scheduling request) or BSR (buffer status report), and indicates to a gNB that a CSI report is going to be transmitted over sidelink. In response, the gNB may provide another mode-1 sidelink grant to the UE with transmission parameters that are appropriate for a transmission of the sidelink CSI report.

In another embodiment, when there is no sidelink grant available in mode-1, a transmitting UE of a sidelink connection will trigger a new SR/BSR, and indicates to a gNB that a CSI report is going to be transmitted over sidelink. In response, the gNB provides a mode-1 sidelink grant to the UE with transmission parameters that are appropriate for a transmission of the sidelink CSI report.

In one embodiment, a CSI report MAC CE can be multiplexed with MAC SDUs (data from upper layers) into a same MAC PDU. In an example, a sidelink MAC CE carrying a CSI report may be always placed before MAC SDUs. In another example, a sidelink MAC CE carrying a CSI report may be always placed after MAC SDUs.

In NR Uu, when a UE gets a grant from a gNB, it will perform LCP (logical channel prioritization) procedure, so that only data from logical channels that fulfills certain restriction, e.g. allowedSCS-List and maxPUSCH-Duration, can be multiplexed in to a MAC PDU and be sent using the assigned grant. In LTE sidelink, when a UE gets a grant, either mode-1 or mode-2, the UE will select a ProSe Destination, having the sidelink logical channel with the highest priority, among the sidelink logical channels having data available for transmission and having the same transmission format as the one selected corresponding to the ProSe Destination.

The present disclosure proposes a new LCP procedure. In one embodiment, one restriction is added to the LCP procedure when UE selects logical channels for a sidelink transmission using assigned a mode-1 sidelink grant, such that only data from logical channels associated with the relevant connection (which is indicated by a connection ID in DCI) can be multiplexed in to a MAC PDU for transmission.

In another embodiment, with a given sidelink grant, when there are both data and a CSI report to be transmitted over sidelink, a UE can prioritize the data transmission or the CSI report transmission based on predefined rules. For example, the rules may include, not limited to, any of the following:

UE always prioritize CSI report transmission than data transmission over sidelink;

A threshold is set, such that data transmission with a LCH (logical channel) priority higher than the threshold will be prioritized than CSI report transmission.

In the above description, embodiments are mainly described in relation to sidelink unicast. However, it can be appreciated that the above embodiments can be easily extended to sidelink groupcast as well. For example, a little difference may be that a sidelink connection ID indicates a one-to-many communication. In this case, a transmitting UE of a sidelink may obtain, from multiple receiving UEs in a group, multiple CSI reports with a same sidelink connection ID.

In the above description, embodiments are mainly described in relation to mode-1 sidelink transmission. However, it can be appreciated that the above embodiments can be easily extended to mode-2 sidelink transmission as well. For mode-2, a sidelink CSI report indicating a state of a sidelink transmission between UEs on resources that are determined by the UEs, can be generated and obtained. This sidelink CSI report can also be forwarded to a gNB, for example which is in connectivity with one of the UEs.

FIG. 9 is a flowchart illustrating a method according to some embodiments of the present disclosure. The method may be performed by an apparatus in/as a base station or communicatively coupled to a base station. In accordance with an exemplary embodiment, the base station may be a gNB.

According to the exemplary method 9000 illustrated in FIG. 9, the base station receives from a first terminal device, at least one report indicating channel state information of at least one sidelink connection associated with the first terminal device, as shown in block 9020. The sidelink connection may be a mode-1 sidelink. The base station may be serving the first terminal device to support a mode-1 sidelink. The report may be a CSI report.

In some embodiments, the base station may further transmit a control information indicative of resources to be used for a transmission of the at least one report from the first terminal device to the base station. The resources may be allocated for the transmission of the at least one report from the first terminal device to the base station, in response to a scheduling request from the first terminal device. In other embodiments, the base station may transmit to the first terminal device, an uplink grant, and an indication indicating that the uplink grant is to be used for a transmission of the at least one report from the first terminal device to the base station.

In some embodiments, a report of the at least one report may indicate an identifier of the at least one sidelink connection. In an example, the identifier can be indicated explicitly, e.g. with a sidelink connection ID included in the report. In another example, the identifier can be indicated implicitly, e.g. with a predefined correspondence between the identifier and other information.

In some embodiments, the base station may further transmit to the first terminal device, a request for the at least one report, as shown at block 9010. This request can trigger a handling of the at least one report. In other words, the base station may receive the at least one report in response to the request. In some embodiments, the request may comprise a control information indicative of resources to be used for the transmission of the at least one report from the first terminal device to the base station. The request may indicate an identifier of the at least one sidelink connection. In an example, the identifier can be indicated explicitly, e.g. with a sidelink connection ID included in the report. In another example, the identifier can be indicated implicitly, e.g. with a predefined corresponding between the identifier and other information. In some embodiments, the request may be transmitted via a DCI a MAC CE, or a RRC message.

In some embodiments, the base station may further adapt sidelink scheduling information based on the received at least one report. The base station may further transmit the sidelink scheduling information to a transmitting party of the at least one sidelink connection. The sidelink scheduling information may indicate the identifier of the at least one sidelink connection. The identifier can be indicated explicitly or implicitly. The sidelink scheduling information may be carried via a DCI.

The first terminal device may be a transmitting party or a receiving party of the at least one sidelink connection. In some embodiments, the request for the at least one report may comprise an indication indicating whether the first terminal device is a transmitting party or a receiving party of the at least one sidelink connection.

In some embodiments, the at least one report is received on PUSCH or PUCCH. The at least one sidelink connection may be for a unicast sidelink transmission or a groupcast sidelink transmission.

In some embodiments, the at least one report may comprise a direction indication of the at least one sidelink connection.

FIG. 10 is a flowchart illustrating a method according to some embodiments of the present disclosure. The method 10000 illustrated in FIG. 10 may be performed by an apparatus implemented in/as a terminal device or communicatively coupled to a terminal device. In accordance with an exemplary embodiment, the terminal device may be a UE, e.g. a mobile station. In the following description with respect to FIG. 10, for the same or similar parts as those in the previous exemplary embodiments, the detailed description will be properly omitted.

According to the exemplary method 10000 illustrated in FIG. 10, the terminal device obtains at least one report indicating channel state information of at least one sidelink connection associated with the terminal device, as shown in block 10020. Then, the terminal device transmits to a base station, the obtained at least one report, as shown block 10030. The terminal device may be a transmitting party or a receiving party of the at least one sidelink connection.

In some embodiments, the terminal device may further receive a control information indicative of resources to be used for a transmission of the at least one report from the terminal device to the base station. Accordingly, the obtained at least one report may be transmitted based on the received control information. In some embodiments, the control information may be received in response to a scheduling request. In this case, the terminal device may transmit to the base station, the scheduling request for the transmission of the at least one report from the terminal device to the base station.

In other embodiments, the terminal device may further receive, from the base station, an uplink grant and an indication indicating that the uplink grant is to be used for a transmission of the at least one report from the terminal device to the base station. In an example, the terminal device may transmit all reports indicating channel state information of a plurality of sidelink connections associated with the terminal device. In another example, the terminal device may select a subset of the all reports based on the uplink grant, such as a size of the uplink grant. As such, the at least one report transmitted to the base station is a subset of the all reports for the sidelink connections associated with the terminal device.

In some embodiments, the terminal device may further receive, from the base station, a request for the at least one report, as shown at 10010. The at least one report may be transmitted in response to the request.

In some embodiments, the terminal device is the transmitting party, and the terminal device may further receive, from the base station, sidelink scheduling information, the sidelink scheduling information indicating the identifier of the at least one sidelink connection. The terminal device may further decide whether or not to use the sidelink scheduling information based on the identifier of the at least one sidelink connection.

In some embodiments, the terminal device may further receive the at least one report from another terminal device associated with the at least one sidelink connection. The terminal device may further transmit a scheduling request to the base station for transmission of the at least one report from said another terminal device to the terminal device; and receive a sidelink grant for the transmission of the at least one report from the base station. The at least one report may be received from said another terminal device over the at least one sidelink connection according to the received sidelink grant.

In some embodiments, the at least one report may be transmitted in one or more MAC CEs, which are multiplexed with MAC data, wherein the one or more MAC CEs are located before or after the MAC data. At least one of the one or more MAC control elements for transmitting the at least one report may be multiplexed with the MAC data from a logical channel associated with the sidelink connection. In some embodiments, the terminal device may further prioritize the transmission for the at least one report and a sidelink data transmission.

Please note that the order for performing the steps described with reference to FIGS. 9 and 10 is illustrated just as an example. In some implementation, some steps may be performed in a reverse order or in parallel. In some other implementation, some steps may be omitted or combined.

It can be therefore seen that, with the proposed solutions for handling sidelink CSI report according to the above embodiments, it would be helpful to improve an efficiency of sidelink transmissions. Furthermore, the solutions enable an efficient way of transmitting CSI report over sidelink.

The various blocks shown in FIGS. 9 and 10 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 11:
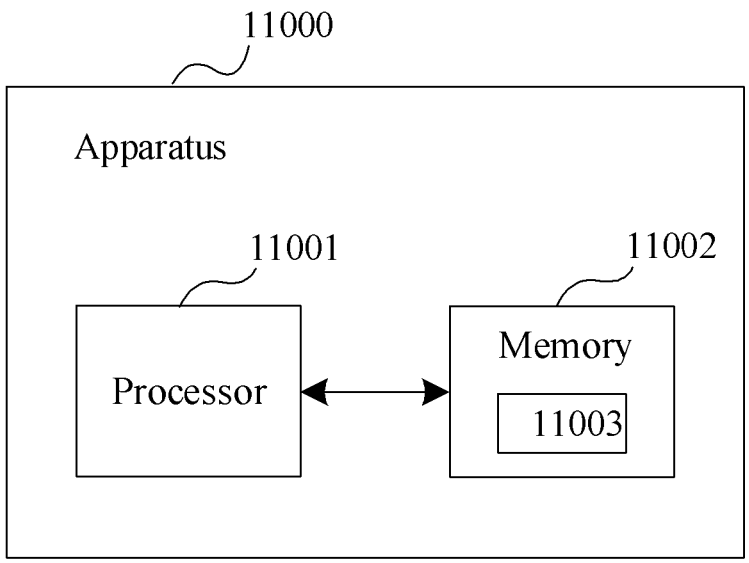
FIG. 11 is a block diagram illustrating an apparatus according to some embodiments of the present disclosure.

FIG. 11 is a block diagram illustrating an apparatus 11000 according to various embodiments of the present disclosure. As shown in FIG. 11, the apparatus 11000 may comprise one or more processors such as processor 11001 and one or more memories such as memory 11002 storing computer program codes 11003. The memory 11002 may be non-transitory machine/processor/computer readable storage medium. In accordance with some exemplary embodiments, the apparatus 11000 may be implemented as an integrated circuit chip or module that can be plugged or installed into a terminal device as described with respect to FIG. 9, or a network node as described with respect to FIG. 10.

In some implementations, the one or more memories 11002 and the computer program codes 1103 may be configured to, with the one or more processors 11001, cause the apparatus 11000 at least to perform any operation of the method as described in connection with FIG. 9. In such embodiments, the apparatus 11000 may be implemented as at least part of or communicatively coupled to the base station as described above. As a particular example, the apparatus 11000 may be implemented as a base station.

In other implementations, the one or more memories 11002 and the computer program codes 11003 may be configured to, with the one or more processors 11001, cause the apparatus 11000 at least to perform any operation of the method as described in connection with FIG. 10. In such embodiments, the apparatus 11000 may be implemented as at least part of or communicatively coupled to the terminal device as described above. As a particular example, the apparatus 11000 may be implemented as a terminal device.

Alternatively or additionally, the one or more memories 11002 and the computer program codes 11003 may be configured to, with the one or more processors 11001, cause the apparatus 11000 at least to perform more or less operations to implement the proposed methods according to the exemplary embodiments of the present disclosure.

Figure 12:
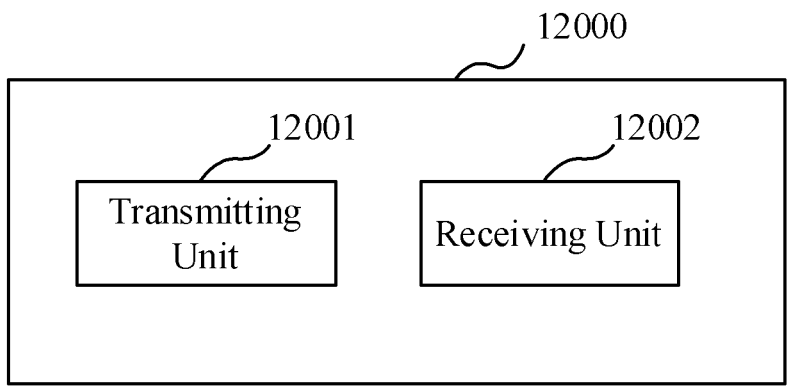
FIG. 12 is a block diagram illustrating an apparatus according to some embodiments of the present disclosure.

FIG. 12 is a block diagram illustrating an apparatus 12000 according to some embodiments of the present disclosure. As shown in FIG. 12, the apparatus 12000 may comprise a transmitting unit 12001 and a receiving unit 12002. In an exemplary embodiment, the apparatus 12000 may be implemented in a base station (e.g. a gNB). The receiving unit 12002 may be operable to carry out the operation in block 9020. The transmitting unit 12001 may be operable to carry out the operation in blocks 9010. Optionally, the transmitting unit 12001 and/or the receiving unit 12002 may be operable to carry out more or less operations to implement the proposed methods according to the exemplary embodiments of the present disclosure.

Figure 13:
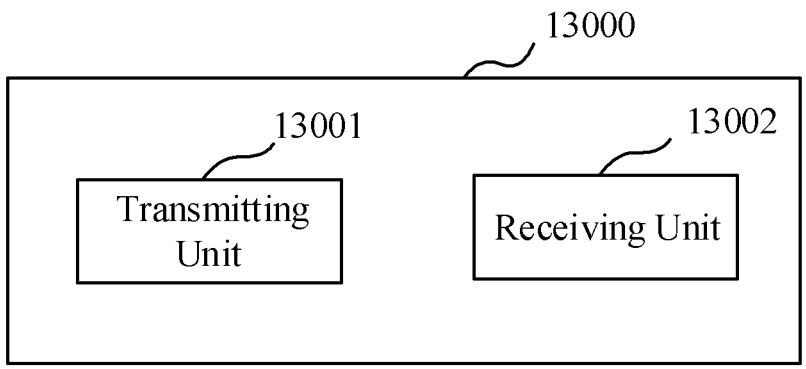
FIG. 13 is a block diagram illustrating an apparatus according to some embodiments of the present disclosure.

FIG. 13 is a block diagram illustrating an apparatus 13000 according to some embodiments of the present disclosure. As shown in FIG. 13, the apparatus 13000 may comprise a transmitting unit 13001, and a receiving unit 13002. In an exemplary embodiment, the apparatus 1300 may be implemented in a terminal device, such as UE. The transmitting unit 13001 may be operable to carry out the operation in block 10030. The receiving unit 13002 may be operable to carry out the operation in block 10020. Further, the receiving unit 13002 may be further operable to carry out the operation in block 10010. Optionally, the transmitting unit 13001 and/or the receiving unit 13002 may be operable to carry out more or less operations to implement the proposed methods according to the exemplary embodiments of the present disclosure.

Figure 14:
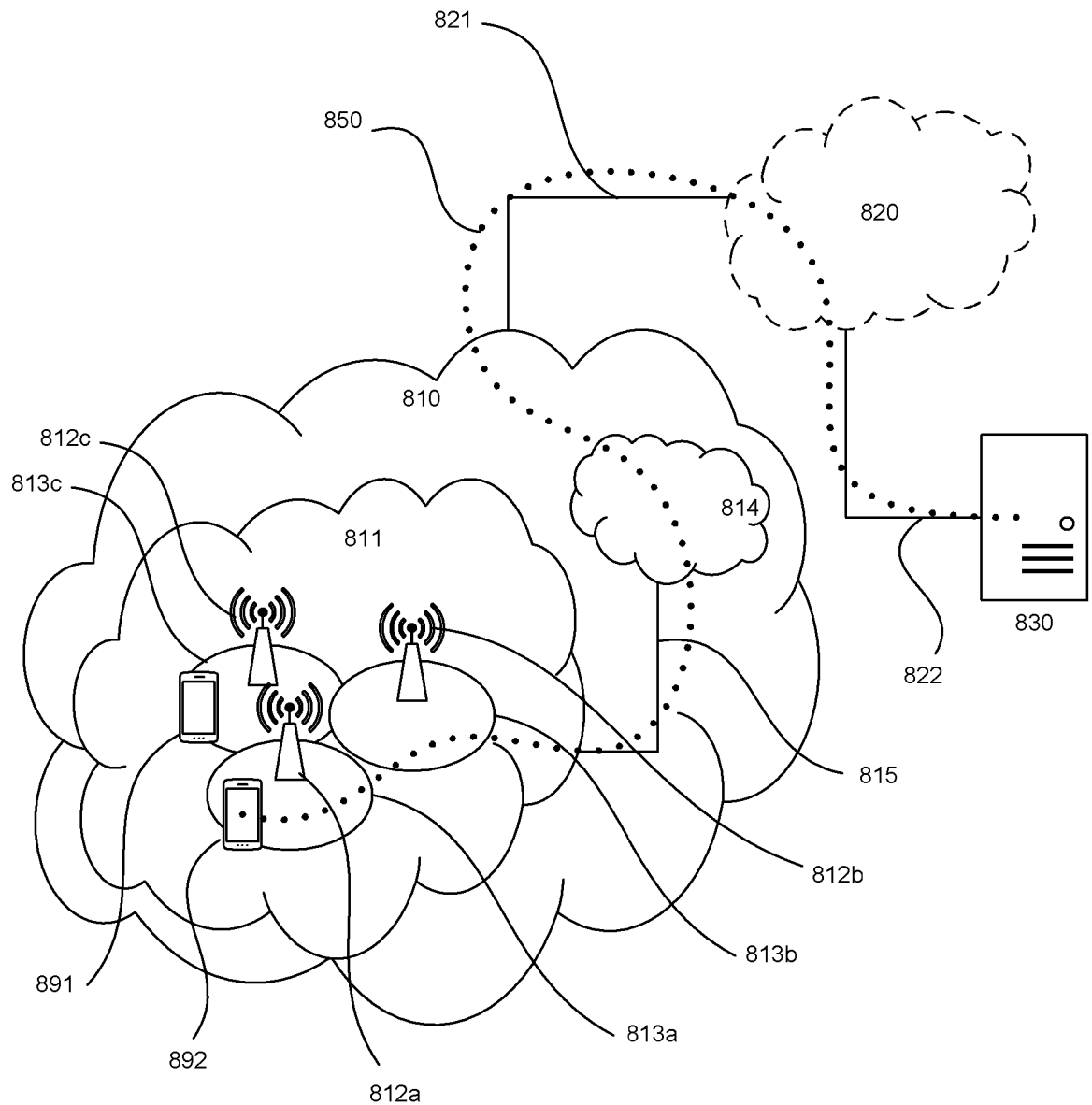
FIG. 14 is a block diagram illustrating a telecommunication network connected via an intermediate network to a host computer in accordance with some embodiments of the present disclosure.

FIG. 14 is a block diagram illustrating a telecommunication network connected via an intermediate network to a host computer in accordance with some embodiments of the present disclosure.

With reference to FIG. 14, in accordance with an embodiment, a communication system includes a telecommunication network 810, such as a 3GPP-type cellular network, which comprises an access network 811, such as a radio access network, and a core network 814. The access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to the core network 814 over a wired or wireless connection 815. A first UE 891 located in a coverage area 813c is configured to wirelessly connect to, or be paged by, the corresponding base station 812c. A second UE 892 in a coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

The telecommunication network 810 is itself connected to a host computer 830, which may be embodied in the hardware and/or software of a standalone server, a cloud-implemented server, a distributed server or as processing resources in a server farm. The host computer 830 may be under the ownership or control of a service provider, or may be operated by the service provider or on behalf of the service provider. Connections 821 and 822 between the telecommunication network 810 and the host computer 830 may extend directly from the core network 814 to the host computer 830 or may go via an optional intermediate network 820. An intermediate network 820 may be one of, or a combination of more than one of, a public, private or hosted network; the intermediate network 820, if any, may be a backbone network or the Internet; in particular, the intermediate network 820 may comprise two or more sub-networks (not shown).

The communication system of FIG. 14 as a whole enables connectivity between the connected UEs 891, 892 and the host computer 830. The connectivity may be described as an over-the-top (OTT) connection 850. The host computer 830 and the connected UEs 891, 892 are configured to communicate data and/or signaling via the OTT connection 850, using the access network 811, the core network 814, any intermediate network 820 and possible further infrastructure (not shown) as intermediaries. The OTT connection 850 may be transparent in the sense that the participating communication devices through which the OTT connection 850 passes are unaware of routing of uplink and downlink communications. For example, the base station 812 may not or need not be informed about the past routing of an incoming downlink communication with data originating from the host computer 830 to be forwarded (e.g., handed over) to a connected UE 891. Similarly, the base station 812 need not be aware of the future routing of an outgoing uplink communication originating from the UE 891 towards the host computer 830.

Figure 15:
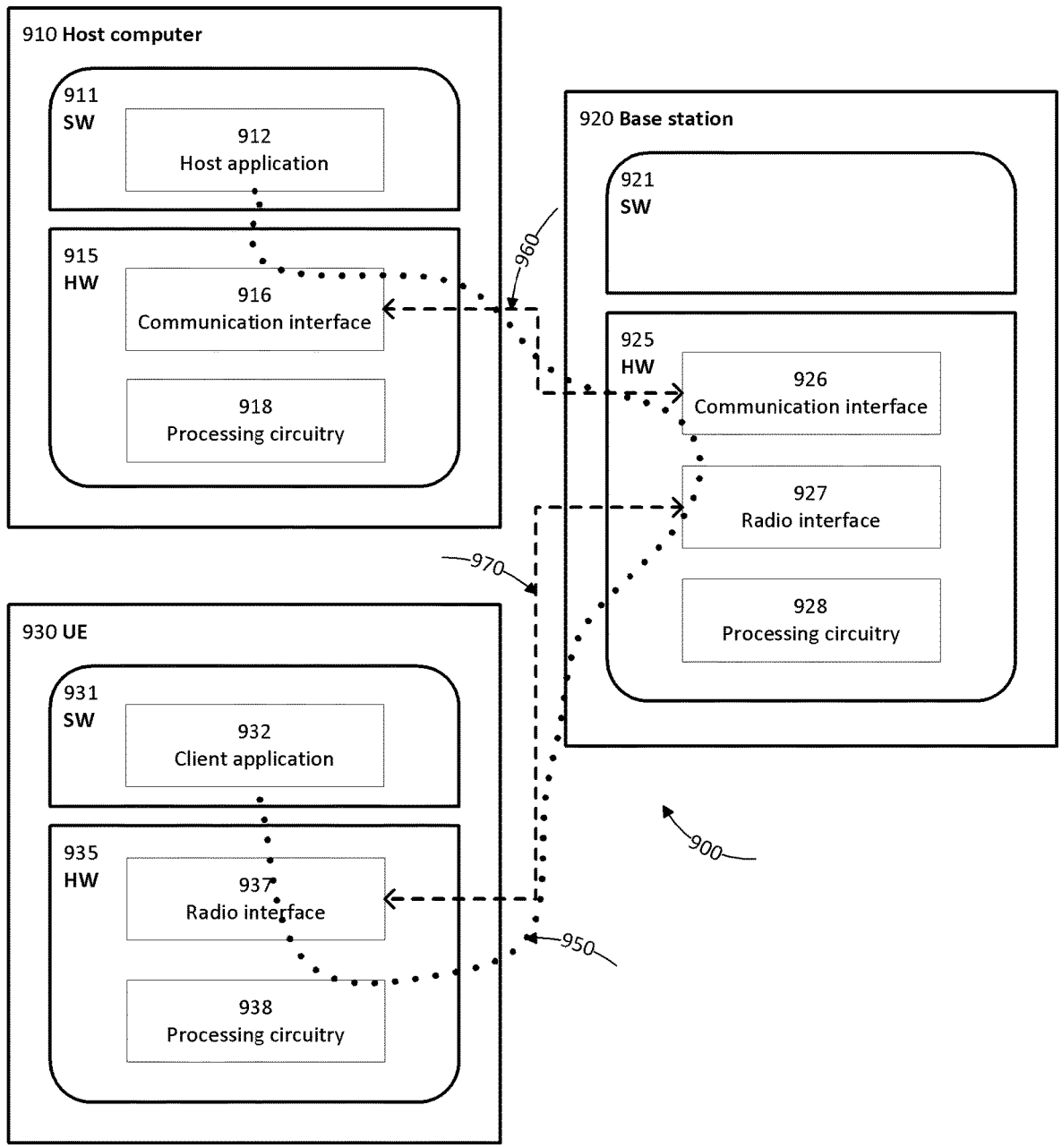
FIG. 15 is a block diagram illustrating a host computer communicating via a base station with a UE over a partially wireless connection in accordance with some embodiments of the present disclosure.

FIG. 15 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 15. In a communication system 900, a host computer 910 comprises hardware 915 including a communication interface 916 configured to set up and maintain a wired or wireless connection with an interface of a different communication device of the communication system 900. The host computer 910 further comprises a processing circuitry 918, which may have storage and/or processing capabilities. In particular, the processing circuitry 918 may comprise one or more programmable processors, application-specific integrated circuits, field programmable gate arrays or combinations of these (not shown) adapted to execute instructions. The host computer 910 further comprises software 911, which is stored in or accessible by the host computer 910 and executable by the processing circuitry 918. The software 911 includes a host application 912. The host application 912 may be operable to provide a service to a remote user, such as UE 930 connecting via an OTT connection 950 terminating at the UE 930 and the host computer 910. In providing the service to the remote user, the host application 912 may provide user data which is transmitted using the OTT connection 950.

The communication system 900 further includes a base station 920 provided in a telecommunication system and comprising hardware 925 enabling it to communicate with the host computer 910 and with the UE 930. The hardware 925 may include a communication interface 926 for setting up and maintaining a wired or wireless connection with an interface of a different communication device of the communication system 900, as well as a radio interface 927 for setting up and maintaining at least a wireless connection 970 with the UE 930 located in a coverage area (not shown in FIG. 15) served by the base station 920. The communication interface 926 may be configured to facilitate a connection 960 to the host computer 910. The connection 960 may be direct or it may pass through a core network (not shown in FIG. 15) of the telecommunication system and/or through one or more intermediate networks outside the telecommunication system. In the embodiment shown, the hardware 925 of the base station 920 further includes a processing circuitry 928, which may comprise one or more programmable processors, application-specific integrated circuits, field programmable gate arrays or combinations of these (not shown) adapted to execute instructions. The base station 920 further has software 921 stored internally or accessible via an external connection.

The communication system 900 further includes the UE 930 already referred to. Its hardware 935 may include a radio interface 937 configured to set up and maintain a wireless connection 970 with a base station serving a coverage area in which the UE 930 is currently located. The hardware 935 of the UE 930 further includes a processing circuitry 938, which may comprise one or more programmable processors, application-specific integrated circuits, field programmable gate arrays or combinations of these (not shown) adapted to execute instructions. The UE 930 further comprises software 931, which is stored in or accessible by the UE 930 and executable by the processing circuitry 938. The software 931 includes a client application 932. The client application 932 may be operable to provide a service to a human or non-human user via the UE 930, with the support of the host computer 910. In the host computer 910, an executing host application 912 may communicate with the executing client application 932 via the OTT connection 950 terminating at the UE 930 and the host computer 910. In providing the service to the user, the client application 932 may receive request data from the host application 912 and provide user data in response to the request data. The OTT connection 950 may transfer both the request data and the user data. The client application 932 may interact with the user to generate the user data that it provides.

It is noted that the host computer 910, the base station 920 and the UE 930 illustrated in FIG. 15 may be similar or identical to the host computer 830, one of base stations 812*a*, 812*b*, 812*c* and one of UEs 891, 892 of FIG. 14, respectively. This is to say, the inner workings of these entities may be as shown in FIG. 15 and independently, the surrounding network topology may be that of FIG. 14.

In FIG. 15, the OTT connection 950 has been drawn abstractly to illustrate the communication between the host computer 910 and the UE 930 via the base station 920, without explicit reference to any intermediary devices and the precise routing of messages via these devices. Network infrastructure may determine the routing, which it may be configured to hide from the UE 930 or from the service provider operating the host computer 910, or both. While the OTT connection 950 is active, the network infrastructure may further take decisions by which it dynamically changes the routing (e.g., on the basis of load balancing consideration or reconfiguration of the network).

Wireless connection 970 between the UE 930 and the base station 920 is in accordance with the teachings of the embodiments described throughout this disclosure. One or more of the various embodiments improve the performance of OTT services provided to the UE 930 using the OTT connection 950, in which the wireless connection 970 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 950 between the host computer 910 and the UE 930, in response to variations in the measurement results. The measurement procedure and/or the network functionality for reconfiguring the OTT connection 950 may be implemented in software 911 and hardware 915 of the host computer 910 or in software 931 and hardware 935 of the UE 930, or both. In embodiments, sensors (not shown) may be deployed in or in association with communication devices through which the OTT connection 950 passes; the sensors may participate in the measurement procedure by supplying values of the monitored quantities exemplified above, or supplying values of other physical quantities from which the software 911, 931 may compute or estimate the monitored quantities. The reconfiguring of the OTT connection 950 may include message format, retransmission settings, preferred routing etc.; the reconfiguring need not affect the base station 920, and it may be unknown or imperceptible to the base station 920. Such procedures and functionalities may be known and practiced in the art. In certain embodiments, measurements may involve proprietary UE signaling facilitating the host computer 910's measurements of throughput, propagation times, latency and the like. The measurements may be implemented in that the software 911 and 931 causes messages to be transmitted, in particular empty or 'dummy' messages, using the OTT connection 950 while it monitors propagation times, errors etc.

Figure 16:
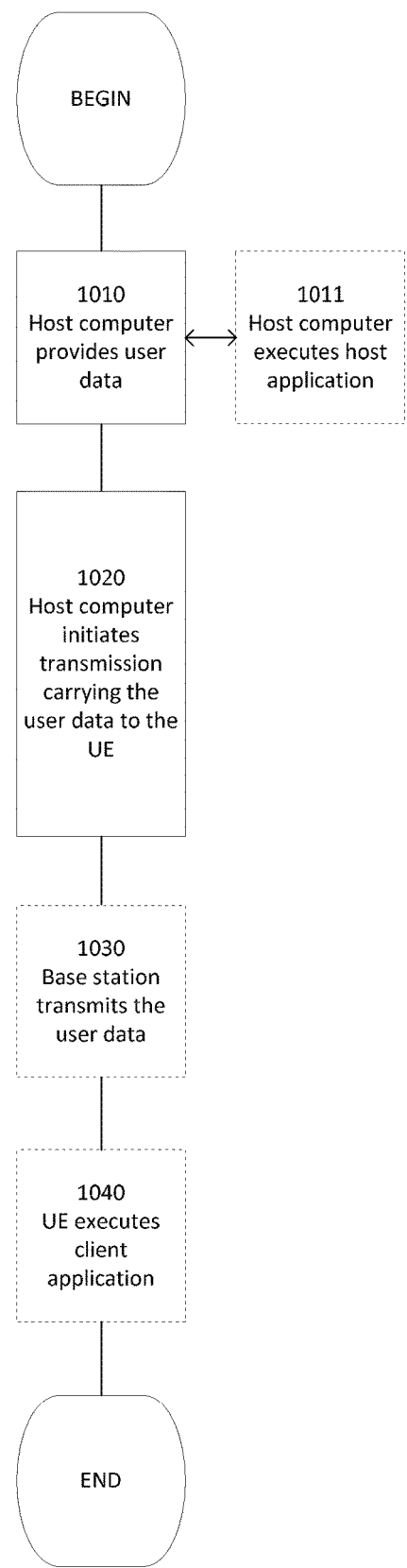
FIG. 16 is a flowchart illustrating a method implemented in a communication system, in accordance with an embodiment of the present disclosure.

FIG. 16 is a flowchart illustrating a method implemented in a communication system, in accordance with an embodiment. The communication system includes a host computer, a base station and a UE which may be those described with reference to FIG. 14 and FIG. 15. For simplicity of the present disclosure, only drawing references to FIG. 16 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 17:
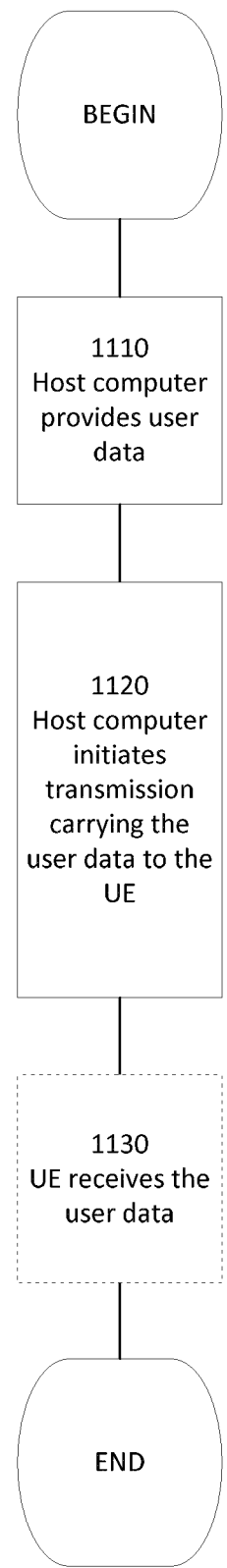
FIG. 17 is a flowchart illustrating a method implemented in a communication system, in accordance with an embodiment of the present disclosure.

FIG. 17 is a flowchart illustrating a method implemented in a communication system, in accordance with an embodiment. The communication system includes a host computer, a base station and a UE which may be those described with reference to FIG. 14 and FIG. 15. For simplicity of the present disclosure, only drawing references to FIG. 17 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 18:
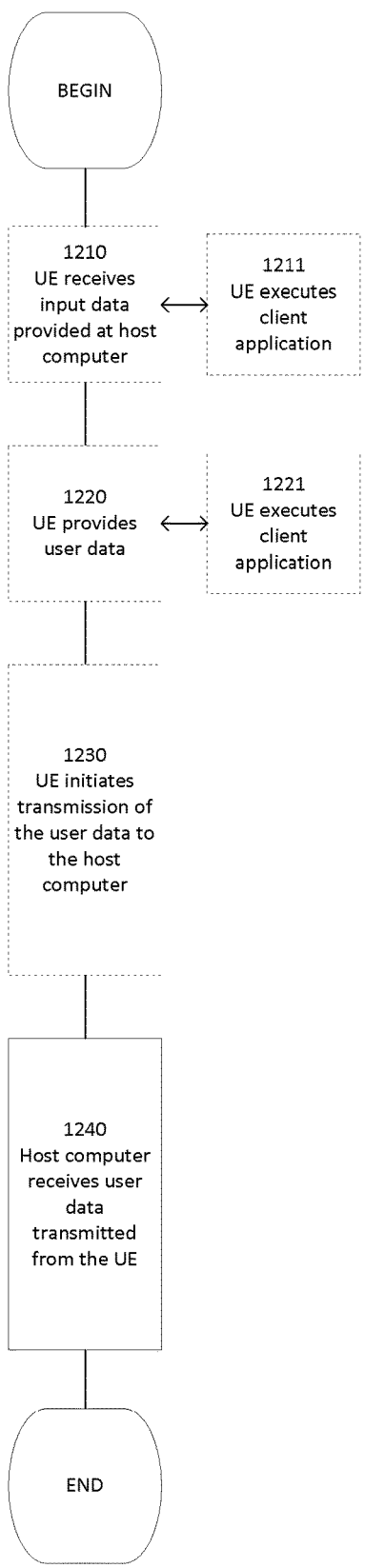
FIG. 18 is a flowchart illustrating a method implemented in a communication system, in accordance with an embodiment of the present disclosure.

FIG. 18 is a flowchart illustrating a method implemented in a communication system, in accordance with an embodiment. The communication system includes a host computer, a base station and a UE which may be those described with reference to FIG. 14 and FIG. 15. For simplicity of the present disclosure, only drawing references to FIG. 18 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

Figure 19:
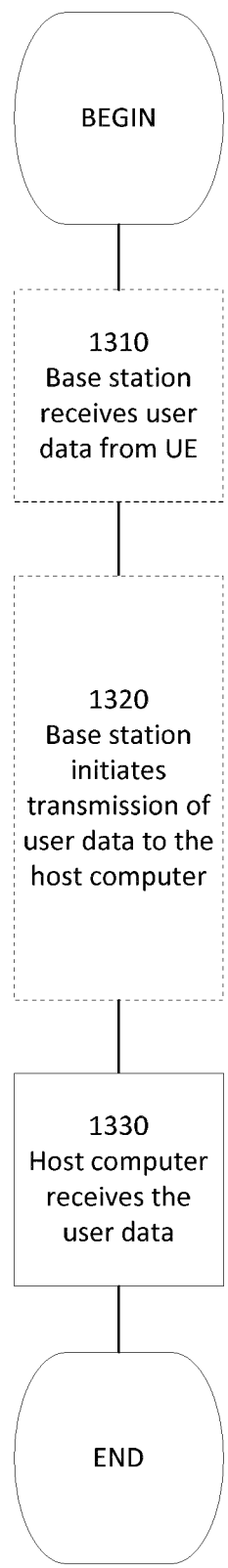
FIG. 19 is a flowchart illustrating a method implemented in a communication system, in accordance with an embodiment of the present disclosure.

FIG. 19 is a flowchart illustrating a method implemented in a communication system, in accordance with an embodiment. The communication system includes a host computer, a base station and a UE which may be those described with reference to FIG. 14 and FIG. 15. For simplicity of the present disclosure, only drawing references to FIG. 19 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a terminal device, the method comprising:
transmitting a scheduling request to a base station for transmission of at least one report, wherein the at least one report indicate channel state information of at least one sidelink connection associated with the terminal device;
receiving from the base station a sidelink grant for the transmission of the at least one report; and
transmitting the at least one report indicating channel state information to another terminal device over the at least one sidelink connection according to the received sidelink grant, wherein the transmitting the at least one report comprises transmitting a medium access control, MAC, control element for the at least one report indicating the channel state information of the at least one sidelink connection to said another terminal device.

2. The method according to claim 1, wherein the MAC control element for the at least one report indicating channel state information of at least one sidelink connection is generated by multiplexing the at least one report into one or more MAC protocol data units, PDUs.

3. The method according to claim 2, wherein the multiplexing the at least one report into one or more MAC comprises:
multiplexing the at least one report with MAC data from a logical channel associated with a sidelink connection in one or more MAC PDUs.

4. The method according to claim 1, before transmitting the at least one report to said another terminal device, further comprising:
performing prioritization to determine whether transmission of the at least one report or transmission of MAC data is to be prioritized over the at least one sidelink connection.

5. The method according to claim 4, wherein the transmission of the at least one report to said another terminal device is prior to the transmission of the MAC data, in response that the determination of prioritization is to prioritize a logical channel of the at least one report over that of the MAC data.

6. The method according to claim 1 wherein the sidelink grant comprises an identifier of the at least one sidelink connection.

7. The method according to claim 1, wherein the sidelink grant is carried via downlink control information.

8. A base station comprising:
one or more processors; and
one or more memories comprising computer program codes,
the one or more memories and the computer program codes configured to, with the one or more processors, cause the base station to:
receive, from a first terminal device, a scheduling request for transmitting of at least one report, wherein the at least one report indicate channel state information of at least one sidelink connection associated with the first terminal device;
transmit, a sidelink grant for a transmission of the at least one report; and
receive, from the first terminal device, the at least one report, wherein the one or more memories and the computer program codes are further configured to receive a medium access control, MAC, control element for the at least one report indicating the channel state information of the at least one sidelink connection associated with the first terminal device.

9. The base station according to claim 8, wherein the sidelink grant comprises an identifier of the at least one sidelink connection.

10. The base station according to claim 8, wherein the sidelink grant is carried via downlink control information.

11. A terminal device comprising:
one or more processors; and
one or more memories comprising computer program codes, the one or more memories and the computer program codes configured to, with the one or more processors, cause the terminal device to:
transmit a scheduling request to a base station for transmission of at least one report, wherein the at least one report indicate channel state information of at least one sidelink connection associated with the terminal device;
receive from the base station a sidelink grant for the transmission of the at least one report; and
transmit the at least one report indicating channel state information to another terminal device over the at least one sidelink connection according to the received sidelink grant, wherein the one or more memories and the computer program codes are further configured to transmit a medium access control, MAC, control element for the at least one report indicating the channel state information of the at least one sidelink connection to said another terminal device.

12. The terminal device according to claim 11, wherein the one or more memories and the computer program codes are further configured to: generate the MAC control element for the at least one report indicating channel state information of at least one sidelink connection by multiplexing the at least one report into one or more MAC protocol data units, PDUs.

13. The terminal device according to claim 12, wherein the one or more memories and the computer program codes are configured to:
multiplex the at least one report with MAC data from a logical channel associated with a sidelink connection in one or more MAC PDUs.

14. The terminal device according to claim 11, wherein the one or more memories and the computer program codes are further configured to:
before transmitting the at least one report to said another terminal device, perform prioritization to determine whether transmission of the at least one report or transmission of MAC data is to be prioritized over the at least one sidelink connection.

15. The terminal device according to claim 14, wherein the one or more memories and the computer program codes are configured to:
transmit the at least one report to said another terminal device prior to the transmission of the MAC data, in response that the determination of prioritization is to prioritize a logical channel of the at least one report over that of the MAC data.

16. The terminal device according to claim 11, wherein the sidelink grant comprises an identifier of the at least one sidelink connection.

17. The terminal device according to claim 11, wherein the sidelink grant is carried via downlink control information.

* * * * *